United States Patent
McKenney (10) Patent No.: US 8,938,631 B2
(45) Date of Patent: Jan. 20, 2015

(54) ENERGY EFFICIENT IMPLEMENTATION OF READ-COPY UPDATE FOR LIGHT WORKLOADS RUNNING ON SYSTEMS WITH MANY PROCESSORS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/539,363

(22) Filed: Jun. 30, 2012

(65) Prior Publication Data

US 2014/0006820 A1    Jan. 2, 2014

(51) Int. Cl.
  *G06F 1/32*    (2006.01)
(52) U.S. Cl.
  USPC .............................. 713/320; 711/147; 712/28
(58) Field of Classification Search
  USPC .............................. 713/320; 711/147; 712/28
  See application file for complete search history.

(56) References Cited

U.S. PATENT DOCUMENTS

| | | | |
|---|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,745 B1 | 2/2006 | Shaylor |
| 6,996,812 B2 | 2/2006 | McKenney |
| 7,191,272 B2 | 3/2007 | McKenney |
| 7,287,135 B2 | 10/2007 | McKenney et al. |
| 7,349,926 B2 | 3/2008 | McKenney et al. |
| 7,353,346 B2 | 4/2008 | McKenney et al. |
| 7,395,263 B2 | 7/2008 | McKenney |
| 7,395,383 B2 | 7/2008 | McKenney |
| 7,426,511 B2 | 9/2008 | McKenney |
| 7,430,673 B2 | 9/2008 | Kardach et al. |
| 7,454,581 B2 | 11/2008 | McKenney et al. |
| 7,472,228 B2 | 12/2008 | McKenney et al. |
| 7,643,964 B2 | 1/2010 | Andrianov |
| 7,653,791 B2 | 1/2010 | McKenney |
| 7,668,851 B2 | 2/2010 | Triplett |
| 7,689,789 B2 | 3/2010 | McKenney et al. |
| 7,734,879 B2 | 6/2010 | McKenney et al. |
| 7,734,881 B2 | 6/2010 | McKenney et al. |
| 7,747,805 B2 | 6/2010 | McKenney |
| 7,814,082 B2 | 10/2010 | McKenney |
| 7,818,306 B2 | 10/2010 | McKenney et al. |
| 7,873,612 B2 | 1/2011 | McKenney et al. |

(Continued)

OTHER PUBLICATIONS

J. Seigh, "RCU + SMR for preemptive kernel/user threads," Linux Kernel Mailing List, May 9, 2005, 2 pages.

(Continued)

*Primary Examiner* — Vincent Tran
(74) *Attorney, Agent, or Firm* — Walter W. Duft (57) ABSTRACT

A technique for determining if a processor in a multiprocessor system implementing a read-copy update (RCU) subsystem may be placed in a low power state. The technique may include performing a first predictive query of the RCU subsystem to request permission for the processor to enter the low power state. If permission is denied, the processor is not placed in the low power state. If permission is granted, the processor is placed in the low power state for a non-fixed duration. Regardless whether permission is denied or granted, a second confirming query of the RCU subsystem is performed to redetermined whether it is permissible for the processor to be in the low power state.

21 Claims, 8 Drawing Sheets

(56) References Cited

U.S. PATENT DOCUMENTS

| | | | |
|---|---|---|---|
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 7,987,166 | B2 | 7/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 2006/0112121 | A1 | 5/2006 | McKenney et al. |
| 2006/0265373 | A1 | 11/2006 | McKenney et al. |
| 2008/0068239 | A1 | 3/2008 | Anderson et al. |
| 2008/0082532 | A1 | 4/2008 | McKenney |
| 2008/0313238 | A1 | 12/2008 | McKenney et al. |
| 2009/0006403 | A1 | 1/2009 | McKenney |
| 2009/0077080 | A1 | 3/2009 | McKenney |
| 2009/0204837 | A1 | 8/2009 | Raval et al. |
| 2009/0320030 | A1 | 12/2009 | Ogasawara |
| 2011/0173471 | A1 | 7/2011 | Gargash |
| 2011/0283082 | A1 | 11/2011 | McKenney et al. |
| 2012/0047140 | A1 | 2/2012 | McKenney et al. |
| 2012/0079301 | A1 | 3/2012 | McKenney |
| 2012/0144129 | A1 | 6/2012 | McKenney |

OTHER PUBLICATIONS

M. Michael, "Hazard Pointers: Safe Memory Reclamation for Lock-Free Objects," IEEE Transactions On Parallel And Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 32 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design And Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology For Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, And, If So, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.

(56) References Cited

OTHER PUBLICATIONS

McKenney, "RCU and Unloadable Modules", LWN.net, Jan. 14, 2007, 4 pages.
P. Zijlstra, "[PATCH] slab: document SLAB_DESTROY_BY_RCU", LKML.org, Nov. 13, 2008, 1 page.
A. Arcangeli et al., "Using Read-Copy-Update Techniques for System V IPC in the Linux 2.5 Kernel," 2003 FREENIX, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions On Parallel And Distributed Systems, vol. x, No. y, Jul. 2009, pp. 1-14.
J. Triplett, "Scalable Concurrent Hash Tables via Relativistic Programming", ACM-SIGOPS Operating System Review vol. 44, Issue 3, Jul. 2010, 14 pages.
T. Gleixner, High Resolution Timers / Dynamic Tics—V2, LWN.net, Oct. 31, 2006, 5 pages.
T. Gleixner et al., "Linux/kernel/time/tick-sched.c", Jan. 2007, 14 pages.
I. Molnar et al., "Linux/kernel/rcutree_plugin.h", Jan. 2009, 21 pages.
F. Weisbecker, "Nohz cpusets", Linux Kernel Mailing List, Aug. 15, 2011, see <https://lkml.org/lkml/2011/8/15/245>, 4 pages.
D. Sarma et al., "Linux/kernel/rcutree.c", Jan. 2008, 32 pages.
I. Molnar et al., "Linux/kernel/rcutree.h", Jan. 2008, 7 pages.
D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.
ip.com et al.; "Avoiding Unnecessary Wakeups When Waking Up CPUs At The Completion Of A Grace Period", IPCOM000216206D, Mar. 25, 2012.
Hornbeck et al.; "Power Management In The Linux Kernel", Apr. 7, 2011, pp. 1-31.

ENERGY EFFICIENT IMPLEMENTATION OF READ-COPY UPDATE FOR LIGHT WORKLOADS RUNNING ON SYSTEMS WITH MANY PROCESSORS

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in a computing environment wherein processors that need to perform callback processing are capable of assuming low power states.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

Figure 1A:
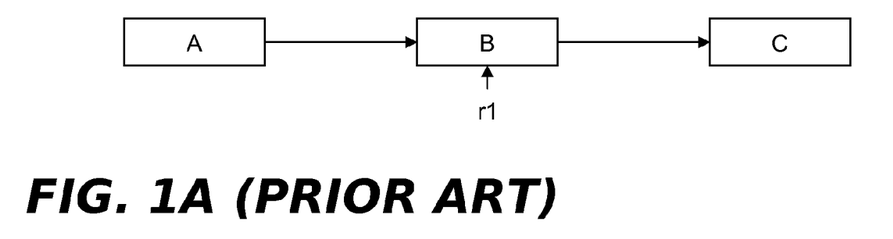
FIGS. 1A-1D are diagrammatic representations of a linked list of data elements undergoing a data element replacement according to a conventional read-copy update mechanism.
Figure 1B:
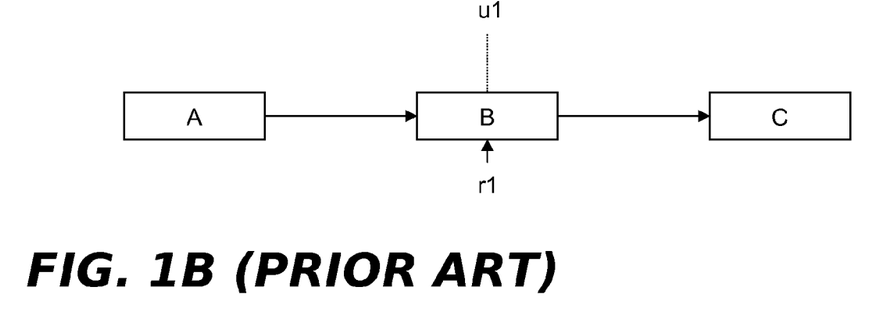
Figure 1C:
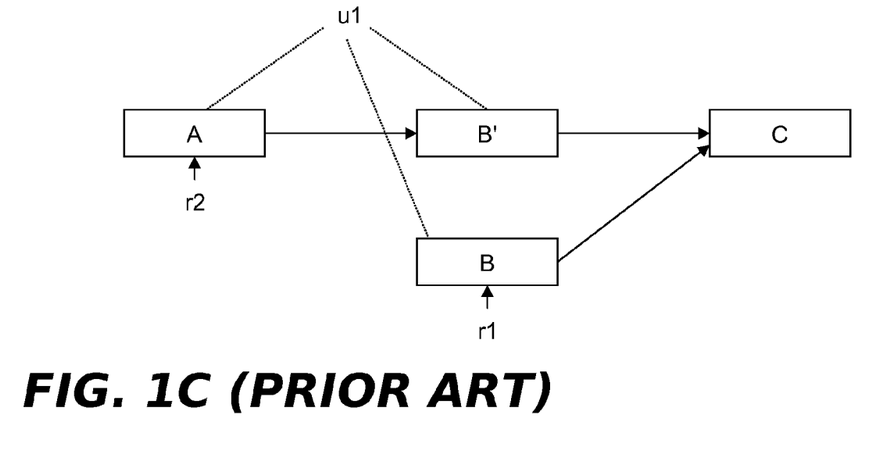

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

Figure 1D:
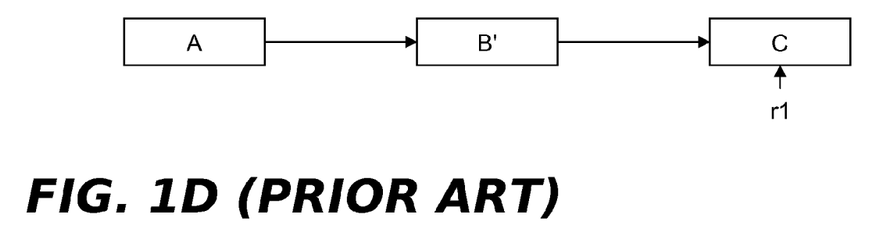

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

Figure 2A:
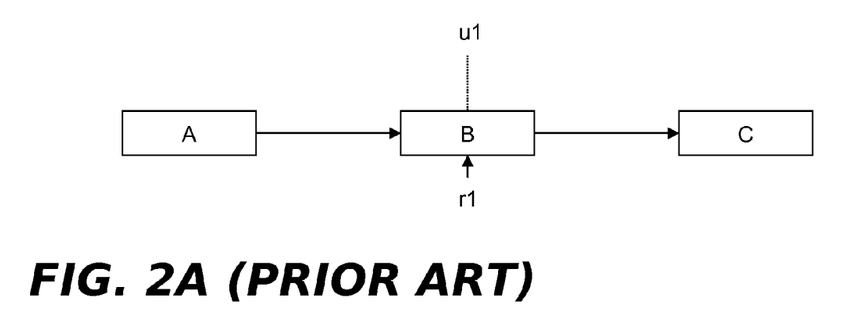
FIGS. 2A-2C are diagrammatic representations of a linked list of data elements undergoing a data element deletion according to a conventional read-copy update mechanism.
Figure 2B:
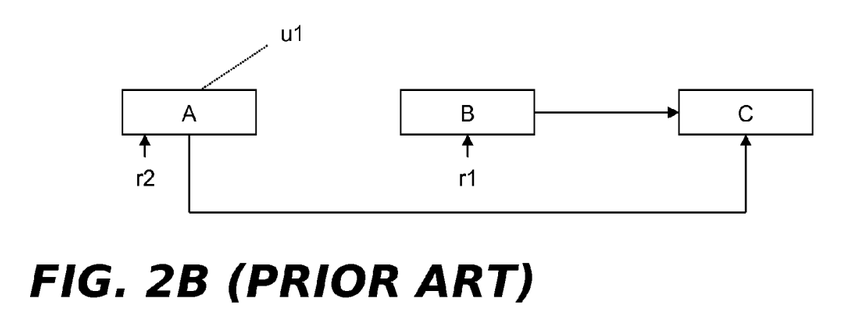
Figure 2C:
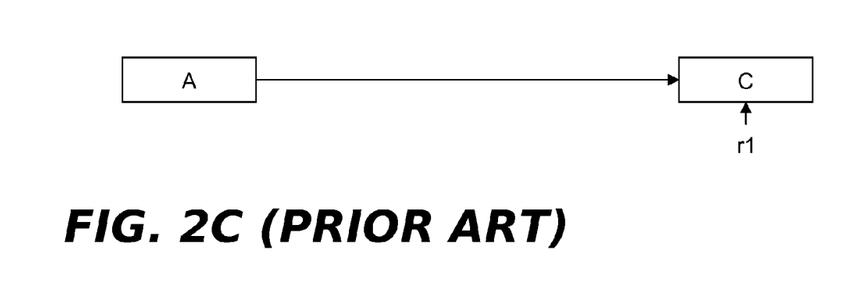

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

Figure 3:
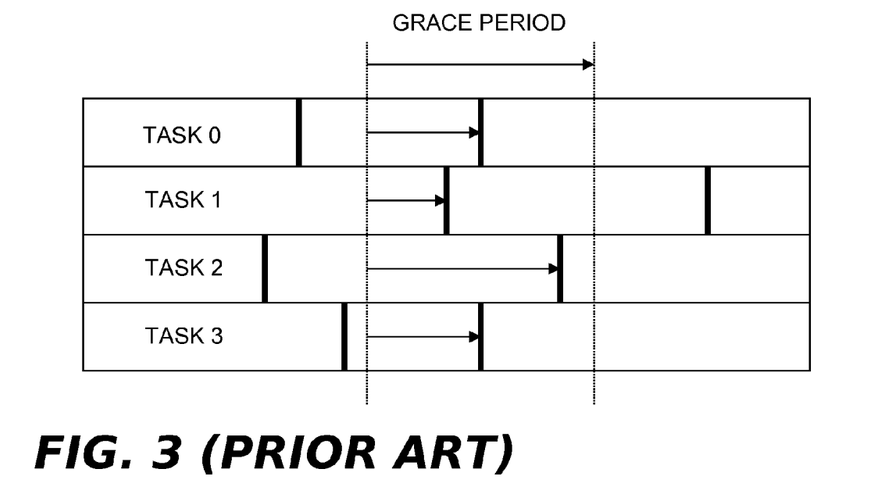
FIG. 3 is a flow diagram illustrating a grace period in which four processes pass through a quiescent state.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may synchronous or asynchronous. According to the synchronous technique, an updater performs the first phase update operation, blocks (waits) until a grace period has completed, and then implements the second phase update operation, such as by removing stale data. According to the asynchronous technique, an updater performs the first phase update operation, specifies the second phase update operation as a callback, then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows asynchronous grace period overhead to be amortized over plural deferred update operations.

More recently, RCU grace period processing has been adapted to account for processor low power states (such as, on Intel® processors, the C1E halt state, or the C2 or deeper halt states). Operating systems can take advantage of low power state capabilities by using mechanisms that withhold regular timer interrupts from processors (in a low power state) unless the processors need to wake up to perform work. The dynamic tick framework (also called "dyntick" or "nohz") in recent versions of the Linux® kernel is one such mechanism. In recent RCU implementations designed for low power applications in the Linux® kernel, the scheduler places a processor in dyntick-idle mode using a function called "tick_nohz_stop_sched_tick( )." Before actually changing the processor's mode, this function invokes another function called "rcu_needs_cpu( )" to check whether the processor has any callback processing work that needs to be performed, even if none needs to be done immediately. Historically, if the processor had pending callbacks, it was not permitted to enter dyntick-idle mode. The reason for this is because grace period and callback detection processing is normally driven by the scheduling clock interrupt, and such processing will not be performed when the scheduling clock tick is suppressed. Unfortunately, keeping the processor out of dyntick-idle mode to wait for callbacks to be invoked can cause the processor to remain in a high-power mode for many milliseconds following the time its power level could have otherwise been reduced.

Commonly-owned U.S. patent application Ser. No. 13/225,425, filed on Sep. 3, 2011 (hereinafter the '425 application), discloses a technique that improves upon the foregoing processing by modifying the rcu_needs_rcu( ) function in order to provide an energy efficient read-copy update implementation for light workloads running on systems with many processors, or for workloads that generate many RCU callbacks. In the Linux® kernel, an embodiment of the disclosed technique is implemented by the RCU_FAST_NO_HZ configuration option. According to the disclosed technique, when an operating system scheduler attempts to place a processor in dyntick-idle mode (or some other low power state that withholds scheduling clock interrupts), the modified rcu_needs_cpu( ) function does several things. During an initial hold-off period, the rcu_needs_cpu( ) function notes if the processor has pending callbacks and returns without the processor being placed in dyntick-idle mode, reporting the callback status to the caller. Once the hold-off period is over, the processor will be prevented from entering a low power state only in the event that there are one or more RCU callbacks that are ready for invocation, or if the processor needs to perform an action that helps advance RCU's grace period machinery and there are also one or more pending callbacks (even if they are not ready to be invoked). In either case, an operation known as callback flush loop processing will be performed for a specified number of passes. This processing results in alternating attempts to (1) advance the RCU grace period machinery and (2) process the callbacks in a clean environment (such as the Linux® kernel's softirq context). In particular, a function called "rcu_process_callbacks( )" is invoked within the softirq environment to advance the callbacks on the callback lists and process any that are ready to be invoked. At the end of callback processing, the rcu_process_callbacks( ) function re-invokes the rcu_needs_cpu( ) function, which then causes the rcu_process_callbacks( ) function to be re-invoked in a separate softirq context, and so on, until there are (hopefully) no callbacks. Each hand off between the rcu_needs_cpu( ) function (initially called by the scheduler attempting to place a processor in dyntick-idle mode) and the rcu_process_callbacks( ) function (called within softirq context) represents one pass through the callback flush loop. Callback flush loop processing is continued for a specified number of passes (e.g., five) or until all of the processor's callbacks have been processed (whichever occurs sooner). If the callback flush operations are successful at removing all pending callbacks within a specified number of passes through the loop, the processor will be placed in dyntick-idle mode.

The technique disclosed in the '425 application allows a processor to be placed in a low power state even if there are pending RCU callbacks, provided none require immediate invocation and the processor is not needed for grace period advancement processing. Under this condition, callbacks that will not be ready for invocation until one or more grace periods in the future will not prevent a processor from entering a low power state. Such pending callbacks will merely be noted so that the processor can be subsequently reawakened when the callbacks become ready. This can be done by setting a per-processor callback flag (which may be given a name such as "rcu_have_callbacks") that is cleared when the callbacks are eventually processed or when the processor leaves its low power state.

The number of passes through the callback flush loop, as well as the hold-off period that is observed before entering the loop, may be selected using per-processor state variables. When RCU ends a grace period, a check may be performed to see if there are any other low power state processors with their rcu_have_callbacks flag set. If so, the corresponding processors may be sent interprocessor interrupts (IPIs) to force them out of their low power state to process their callbacks.

Although the technique disclosed in the '425 application works well, the Linux® kernel's RCU API can now reliably detect transitions of tasks to and from the idle loop. This allows the decision making rules implemented by rcu_needs_cpu( ) to be relaxed in favor of allowing low power states to be entered more frequently. Also, the use of IPIs to awaken low power state processors to perform RCU processing at the end of grace periods can result in undesirable overhead if the target processor was already awakened for some other reason. Finally, applicant has determined that it would be desirable to address a design feature of current implementations of the Linux® kernel that restricts RCU to processing a limited number of RCU callbacks at a time (e.g., 10) unless there is an excessive number of RCU callbacks to be processed (e.g., 10,000 or more). This restriction is useful for limiting RCU's impact on scheduling latency, but applicant submits that such limiting may not always be necessary. What is needed is a way for RCU to determine when there is no latency penalty for invoking larger batches of RCU callbacks at a time.

SUMMARY

A method, system and computer program product are provided for determining if a processor in a multiprocessor system implementing a read-copy update (RCU) subsystem may be placed in a low power state. In an example embodiment, the disclosed technique includes performing a first predictive query of the RCU subsystem to request permission for the processor to enter the low power state. If permission is denied, the processor is not placed in the low power state. If permission is granted, the processor is placed in the low power state for a non-fixed duration. Regardless whether permission is denied or granted, a second confirming query of the RCU subsystem is performed to redetermine whether it is permissible for the processor to be in the low power state.

In an example embodiment, the permission is granted if the processor has no pending callbacks or is not in a holdoff period following a previous invocation of the second confirming query. The permission is denied only if the holdoff period is in effect.

In an example embodiment, the second confirming query includes: (1) maintaining the processor in its current power state if the processor has no pending RCU callbacks; (2) maintaining the processor in its current power state if the processor has pending RCU callbacks and the holdoff period is in effect, (3) maintaining the processor in its current power state if the processor has pending RCU callbacks but they are not ready for invocation, if the holdoff period is not in effect, and if the processor has no other RCU work to perform, this operation further including setting a low power state time limit, such that if the processor is in a non-fixed duration low power state, the low power state becomes a fixed-duration low power state; and (4) performing callback flush loop processing if a holdoff period is not in effect and if the processor has pending RCU callbacks that are ready for invocation or has other RCU work to perform.

In an example embodiment, the low power state time period is set using a programmed timer. The timer may be set to a first timer value if there are non-lazy RCU callbacks and a second timer value that is longer than the first timer value if only lazy RCU callbacks are present. As used herein, the term "lazy RCU callbacks" refers to RCU callbacks whose only job is to free memory. The term "non-lazy RCU callbacks" refers to RCU callbacks that do something other than, or in addition to, freeing memory, such as waking something up.

In an embodiment, the RCU subsystem may processes an unlimited number of RCU callbacks in a single invocation if the processor has no other work to perform. The processor may be determined to have no other work to perform if it is in an idle state with no pending scheduling change and no other immediate processing that needs to be performed by the processor.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

The present disclosure provides an improved energy efficient RCU implementation for light workloads running on systems with many processors. The new implementation differs from the technique disclosed in the '425 application discussed in the "Background" section above. In particular, the operations performed by the rcu_needs_cpu( ) function have been modified and split into two separate operations that separate the decision to allow a processor to enter dyntick-idle mode (or other low power state) from the callback flush processing that accelerates the processor's entry into a low power state. The rcu_needs_cpu( ) function is now a very minimal function that a scheduler uses to query RCU to request permission to place a processor in a low power state. If rcu_needs_cpu( ) predicts that the processor can safely enter a low power state, the scheduler will disable the scheduling-clock interrupt for that processor and place it in a low power state. Then the scheduler invokes a new function, which may be called "rcu_prepare_for_idle( )" in order to verify that the low power state was properly entered, and if not, to have the processor perform whatever work is needed by RCU so that the processor may resume its low power state. The result returned by the new rcu_needs_cpu( ) function is in the nature of a prediction insofar as a full determination of whether the low power state was appropriately entered is not made until a subsequent time when the rcu_prepare_for_idle( ) function is invoked. If rcu_needs_cpu( ) incorrectly predicts that the processor can enter a low power state, then the processing performed by rcu_needs_cpu( ) will force RCU core processing to execute, which has the side-effect of the processor exiting the low power state. On the other hand, if rcu_needs_cpu( ) incorrectly predicts that the processor cannot enter the low power state, the event that invalidates the prediction will provide the processor another chance to enter this state. An example event is an interrupt that invokes RCU core processing, that in turn invokes all callbacks for this processor. In that case, the interrupt-exit code will attempt to enter a low power state, which will succeed because the prediction in the absence of RCU callbacks will be that the processor can in fact enter the low power state. Nevertheless, a good prediction record is beneficial, since failed predictions result in redundant reprogramming of the hardware that generates the scheduling-clock interrupt.

The prediction made by rcu_needs_cpu( ) is based on two factors:

1. Does the processor have any RCU callbacks? If not, then the processor is predicted to be able to enter a low power state, regardless of the second factor;

2. Is the processor in a holdoff period due to having recently repeatedly and unsuccessfully tried to enter a low power state? If not, then the processor is predicted to be able to enter the low power state, regardless of the first factor.

Thus, a processor is predicted to be unable to enter a low power state only if it both has RCU callbacks and has recently repeatedly and unsuccessfully tried to enter a low power state.

The implementation of the present disclosure further differs from the technique disclosed in the '425 application in that the latter an IPI at grace-period end to awaken processors that entered a low power state with RCU callbacks pending. This can result in needless IPIs in the case where the target processor was awakened for some other reason in the meantime. The present disclosure instead uses a per-processor high resolution timer (hrtimer) that is set for the duration of a typical grace period (e.g., 6 "jiffies", or normal intervals between scheduling-clock interrupts in current implementations of the Linux® kernel). An advantage of using an hrtimer over an IPI is that the processor can quickly and efficiently cancel the hrtimer should it awaken for any reason. Because the processor awakens when the timer goes off, the timer is always canceled. Its handler never actually executes. This is permissible because the hrtimer's job is done when it awakens the processor. If desired, the hrtimer may be programmed with first timer value if there are non-lazy RCU callbacks and a second timer value that is longer than said first timer value if only lazy RCU callbacks are present.

As another added feature of the implementation presented in the present disclosure, RCU's callback processing batch limitation may be relaxed if it is determined that the processor performing the callback processing has nothing else to do. The RCU callback processing batch-size limit is used to avoid degrading operating system responsiveness (including realtime response) in the presence of large numbers of RCU callbacks. However, if the processor has nothing else to do, continuing to invoke RCU callbacks cannot degrade responsiveness. Instead of exiting RCU callback processing when more than a given number of RCU callbacks have been invoked, such processing may be continued as long as:

1. The processor is not in an idle loop; and
2. There is no scheduling change pending on the processor; and
3. There are no other softirq handlers pending.

Example Embodiments

Figure 4:
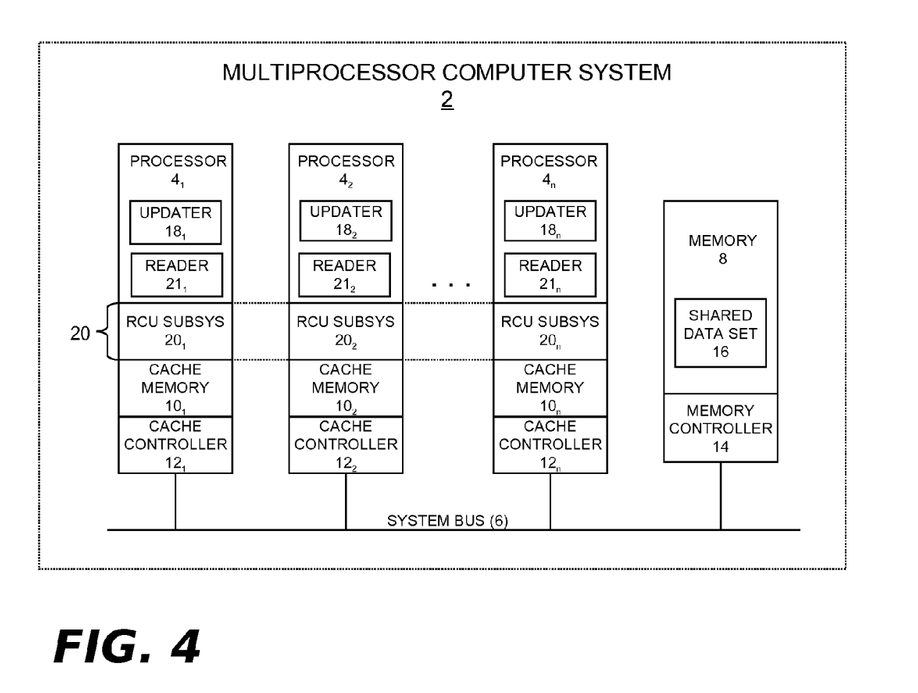
FIG. 4 is a functional block diagram showing a multiprocessor computing system that may be implemented in accordance with the present disclosure.

Turning now to the figures, wherein like reference numerals represent like elements in all of the several views, FIG. 4 illustrates an example multiprocessor computer system in which the grace period processing technique described herein may be implemented. In FIG. 4, a computer system 2 includes multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A conventional memory controller 14 is again associated with the memory 8.

As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 114 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 are programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing. Alternatively, the updater 18 may request a synchronous expedited grace period.

The grace period processing performed by the RCU subsystem 20 entails starting new grace periods and detecting the end of old grace periods so that the RCU subsystem 20 knows when it is safe to free stale data (or take other actions). Grace period processing may further entail the management of callback lists that accumulate callbacks until they are ripe for batch processing at the end of a given grace period.

Figure 5:
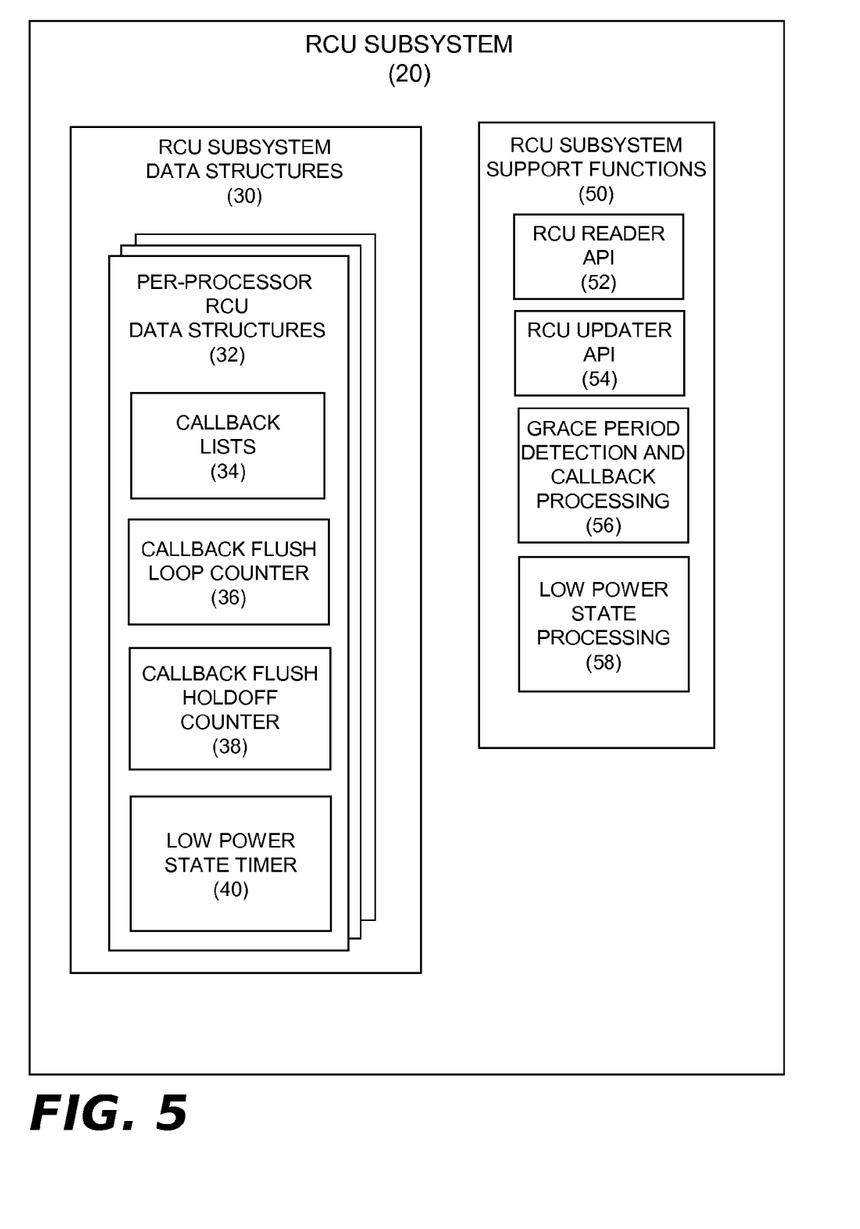
FIG. 5 is a functional block diagram showing an RCU subsystem that may be provided in the computer system of FIG. 4.

Turning now to FIG. 5, example components of the RCU subsystem 20 are shown. These components include RCU subsystem data structures 30, some of which are replicated for each of the processors $4_1, 4_2 \ldots 4_n$ as per-processor RCU data structures 32. The per-processor data structures 32 include a set of per-processor callback lists 34, a callback flush loop counter 36, a callback flush loop holdoff counter 38, and a low power state timer structure 40 for managing an hrtimer. The manner in which the per-processor data structures 32 are used is described in more detail below. Note that the first of these data structures, i.e., the callback lists 34, represents prior art because such lists are found in many conventional RCU implementations, typically as separate list portions (segments) of a single linked list. The callback flush loop counter 36 and the callback flush loop holdoff counter 38 also represent prior art because they are used for callback flush loop processing in the Linux® RCU_FAST_NO_HZ configuration option described in the "Background" section above. The low power state timer control structure 40 is new. Although this data structure is shown as a per-processor variable in FIG. 5, it could also be stored in a leaf rcu_node structure in a hierarchical RCU implementation. It should be further noted that a production read-copy update implementation will typically include many additional data structures that are not shown in FIG. 5. A discussion of such data structures is omitted for ease of description and in order to focus attention on the particular RCU technique disclosed herein.

The components of the RCU subsystem 20 also include several RCU subsystem support functions 50, namely, an RCU reader API (Application Programming Interface) 52, an RCU updater API 54, a set of RCU core processing functions 56, and a set of low power state processing functions 58.

Figure 6:
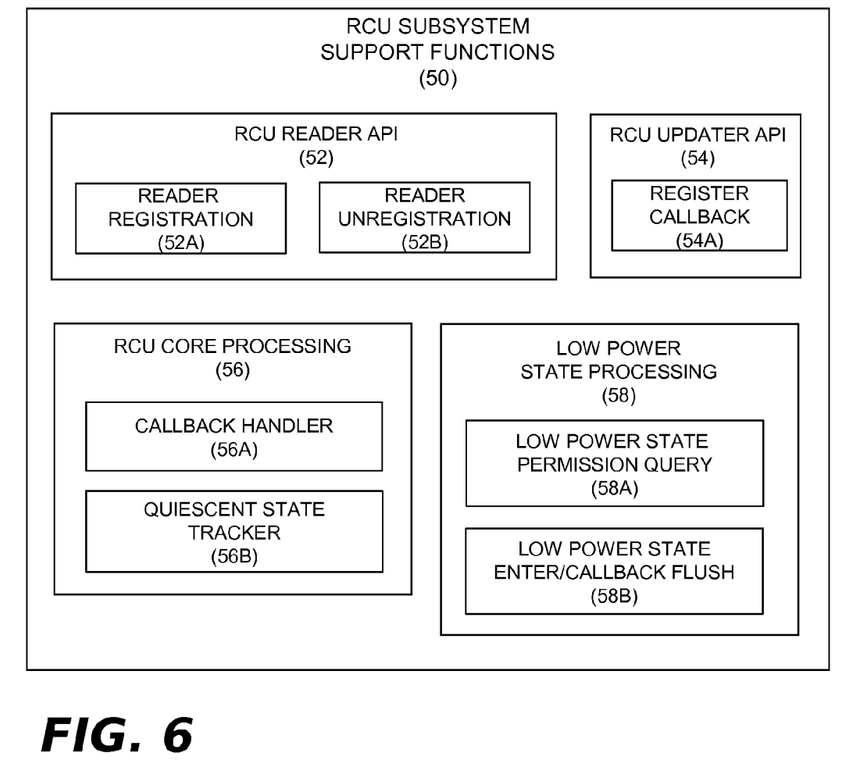
FIG. 6 is a block diagram showing a set of RCU subsystem support functions that be provided by the RCU subsystem of FIG. 5.

As shown in FIG. 6, the RCU reader API 52 comprises a reader registration component 52A and a reader unregistration component 52B. These components are respectively invoked by readers 21 as they enter and leave their RCU read-side critical sections. This allows the RCU subsystem 20 to track reader operations and determine when readers are engaged in RCU-protected read-side critical section processing. In an example embodiment, the reader registration component 52A and the reader unregistration component 52B may be respectively implemented using the rcu_read_lock( ) and rcu_read_unlock( ) primitives found in existing read-copy update implementations.

The RCU updater API 54 comprises a register callback component 54A. The register callback component 54A is used by updaters 18 to register a callback following a first-phase update to a shared data element 16. A call to the register callback component 54A initiates processing that places the callback on one of the RCU callback lists 34 associated with the processor 4 that runs the updater 18. This starts an asynchronous grace period so that the callback can be processed after the grace period has ended as part of second-phase update processing to remove stale data (or perform other actions). In an example embodiment, the register callback component 54A may be implemented using the existing call_rcu( ) primitive found in conventional read-copy update implementations.

In the preceding paragraph, it was noted that the register callback component 54A places a callback on one of the RCU callback lists 34 for a given processor 4. In an example embodiment, the RCU callback lists 34 for each processor $4_1, 4_2 \ldots 4_n$ may comprise four separately identified list portions of a single RCU callback list. These list portions may be referred to as "done," "current," "next-ready" and "next." Each of these callback list portions may be processed in separate stages in conjunction with separate grace periods. This allows new callbacks to safely accumulate while other callbacks are being processed. For example, at the end of a given grace period, all callbacks on the done list portion will be ready for immediate invocation. Callbacks on the current list portion will be invoked at the end of the next following grace period. New callbacks are placed on the next list portion and will not be ready to be invoked until the end of the second grace period that follows the current grace period. The next-ready list portion provides an optimization that allows for the fact that different processors have different ideas of the current grace period.

The component of the RCU subsystem 20 that actually processes callbacks is a callback handler 56A, which is one of the RCU core processing functions 56. The callback handler could be (and usually is) executed in a deferred manner in a separate environment (such as in softirq context in the Linux® kernel). The RCU core processing functions also include a quiescent state tracker 56B, which tracks processor quiescent states and RCU grace periods.

The low power state processing functions 58 include a low power state permission query function 58A and a low power state enter/callback flush function 58B. The low power state permission query function 58A embodies the modified rcu_needs_cpu( ) function described in the Introduction section above. The low power state enter/callback flush function 58B embodies the new rcu_prepare_for_idle( ) function described in the Introduction section. The operations of these functions are described in more detail below in connection with FIGS. 8-10.

Figure 7:
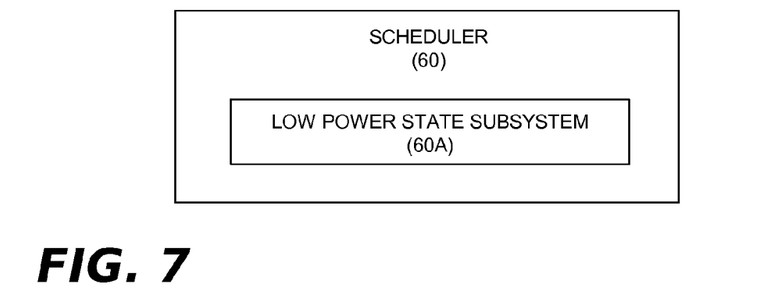
FIG. 7 is a block diagram showing an operating system scheduler that includes a low power state subsystem.

FIG. 7 illustrates an operating system scheduler 60 that includes a low power state subsystem 60A. The low power state subsystem 60A is responsible for placing idle processors 4 in a low power state when it is permissible to do so. In the Linux® kernel, such a low power state would be exemplified by the dynticks-idle operational mode. In an example embodiment, the low power state subsystem 60A may be implemented using the existing tick_nohz_stop_sched_tick( ) function found in current versions of the Linux® scheduler. See Linux® 3.4.4 source code, tick_nohz_stop_sched_tick( ) function at lines 274-445 of Linux/kernel/time/tick-sched.c.

Figure 8:
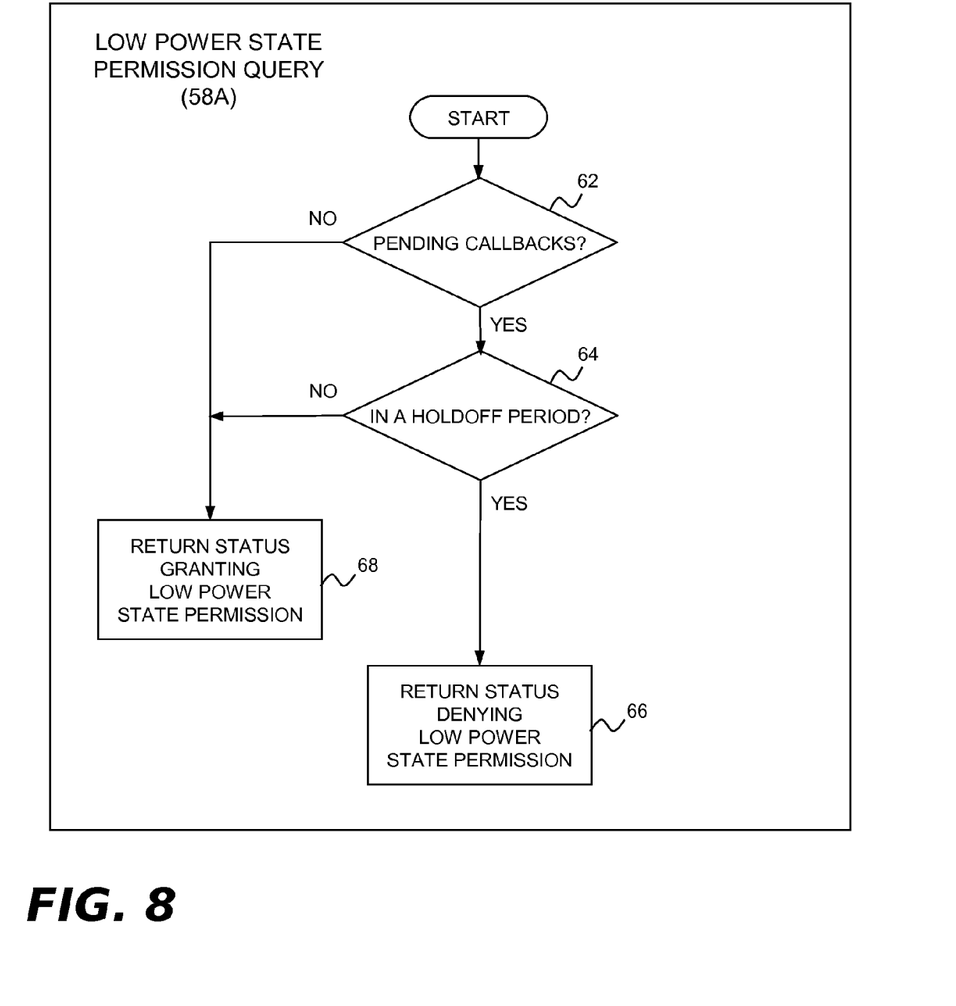
FIG. 8 is a flow diagram showing an example low power state permission query RCU support function.

With reference now to FIG. 8, example operations that may be performed by the low power state permission query function 58A are shown. This function is invoked by the scheduler's low power state subsystem 60A in order to quickly place one of the processors $4_1, 4_2 \ldots 4_n$ in a low power state in which the scheduling clock interrupt is suppressed (such as dyntick-idle mode). The low power state subsystem 60A uses the low power state permission query function 58A as a way of predicting whether the RCU subsystem 20 can tolerate the anticipated low power state, and either enter or not enter that state based on the prediction. If the RCU subsystem 20 does not object, the scheduler's low power state subsystem 60A will immediately place the processor in a low power state. If the RCU subsystem 20 does object, the low power state subsystem 60A will defer such processing to a later time. As described in the Introduction section, the effect of incorrectly predicting that a processor may enter a low power state is mitigated by the fact that the processing performed by the low power state enter/callback flush function 68B will force RCU core processing to execute, which has the side-effect of the processor exiting the low power state. On the other hand, the effect of incorrectly predicting that the processor cannot enter the low power state is mitigated by the fact that the event which invalidates the prediction will provide the processor another chance to enter this state.

In block 62, a check is made to determine whether the target processor 4 has any pending callbacks. If it does, block 64 a further check is made to determine whether the processor is in a holdoff period following a failed attempt by the power state enter/callback flush function 58B to place the processor in a low power state (using the flush loop processing described in more detail below). If a holdoff period is in effect, the low power state permission query function 58A returns to its caller in block 66, reporting a status value indicating that permission to place the target processor 4 in a low power state is denied. If block 62 determines there are no pending callbacks, or if block 64 determines that a holdoff period is not in effect, the low power state permission query function 58A returns to its caller in block 68, reporting a status value indicating that permission to place the target processor 4 in a low power state is granted. Note that a holdoff period will not be in effect if a low power state processing effort is currently underway, or if the holdoff period has elapsed. The low power state permission query function 58A thus grants permission to place a processor in a low power state if either: (1) There are no callbacks on the processor, (2) the processor has not yet attempted to enter a low power state, or (3) the processor is currently in the process of attempting to enter a low power state. Otherwise, if an attempt to place the processor in a low power state has been recently tried and failed, permission to retry will be refused (until the holdoff period elapses).

Figure 9:
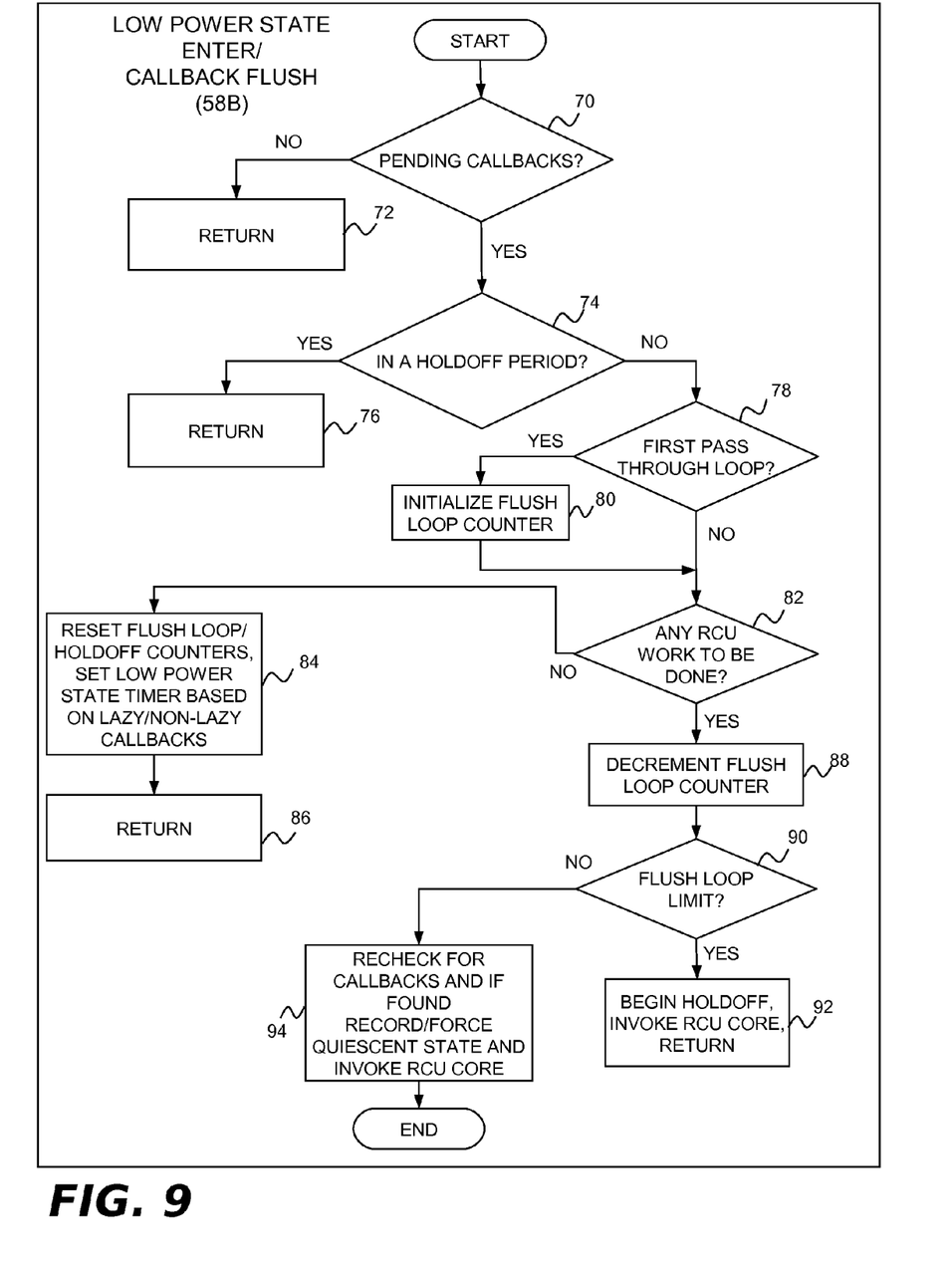
FIG. 9 is a flow diagram showing an example low power state enter/callback flush RCU support function.

Turning now to FIG. 9, example operations that may be performed by the low power state enter/callback flush function 58B are shown. This function runs with interrupts disabled. The function is initially invoked by the scheduler's low power state subsystem 60A during the idle mode of one of the processors $4_1, 4_2 \ldots 4_n$ in order to initiate an attempt to place the processor in a low power state in which the scheduling clock interrupt is suppressed (such as dyntick-idle mode). The function is thereafter called one or more times by the callback handler 56A during callback flush loop processing in order to implement a new pass through the callback flush loop.

The low power state enter/callback flush function 58B determines if there is any RCU callback processing work that needs to be done by the target processor 4, and if so, schedules softirq context processing to get it done. The goal is for the target processor 4 to clear out all work required by the RCU subsystem for the current grace period, so that this processor can be permitted to enter a low power state. In some cases, the target processor 4 will need to be awakened from the low power state at the end of a grace period by whatever processor ends the grace period. This allows the processor 4 to go into a low power state more quickly, and to reduce the number of wakeups by a modest integer factor. The callback flush loop counter 38 (see FIG. 5) controls the sequencing.

With reference now to FIG. 9, example operations that may be performed by the low power state enter/callback flush function 58B are shown. In block 70, a check is made to determine whether the target processor 4 has any pending RCU callbacks. If not, the low power state enter/callback flush function 58B returns to its caller in block 72. Typically, because the previous invocation of the low power state permission query function 58A will have resulted in the target processor 4 being placed in a low power state, the return to caller in block 72 will result in the processor remaining in a low power state. In block 74, the callback flush holdoff counter 38 (see FIG. 5) is sampled to determine if a holdoff period is in effect. If it is, the low power state enter/callback flush function 58B returns to its caller in block 76. Typically, because the previous invocation of the low power state permission query function 58A will have resulted in the target processor 4 being held out of a low power state, the return to caller in block 72 will result in the processor remaining at full power. If block 74 determines that a holdoff period is not in effect, block 78 checks whether this is the first pass through the callback flush loop. If so, block 80 initializes the callback flush loop counter 36 (see FIG. 5).

If this is not the first pass through the callback flush loop, a check is made in block 82 whether the current processor 4 has any RCU work to be done, meaning that there callbacks requiring invocation or the processor needs to perform some action to advance the RCU subsystem's grace period machinery. In an example embodiment, the operation of block 82 may be implemented using the rcu_pending( ) function found in current RCU implementations in the Linux® kernel. Block 82 may thus check whether (1) there are any callbacks on the donelist portion of the processor's callback lists 34 (i.e., callbacks ready for immediate invocation), (2) the processor is unaware of the beginning or end of a grace period and needs to update its state accordingly, (3) the processor needs to inform the RCU subsystem 20 of a recent passage through a quiescent state, (4) the processor needs another grace period but the RCU subsystem 20 has gone idle, and (5) a grace period has lasted too long such that other processors may need to be awakened. If block 82 determines that none of these conditions is present, it means that the processor 4 does not have any RCU callbacks that are ready for invocation and the RCU subsystem 20 does not require any grace period advancement processing from the current processor 4. In that case, the processor 4 may be safely placed in a low power state in block 84. However, before taking that action, it may be desirable to make one or more additional passes through the callback flush loop processing that includes block 82 in order to increase the probability of successfully flushing the callbacks that are present. Block 84 also updates the callback flush loop counter 36 and the callback flush holdoff counter 38. This updating entails setting the flush loop counter 36 to a value signifying the end of flush loop processing, and setting the holdoff counter 38 to a value signifying that no holdoff period is in effect. Block 84 also sets the processor's low power state timer 40 (see FIG. 1) that determines when the processor 4 will be awakened out of the low power state. The low power state timer 40 may be set to different timeout values depending on whether there are "lazy" RCU callbacks or "non-lazy" RCU callbacks. As previously discussed, lazy RCU callbacks are non-urgent RCU callbacks that do nothing more than freeing memory. Such RCU callbacks may usually be safely deferred for some time on an idle processor 4. Non-lazy RCU callbacks are RCU callbacks that perform other processing, and are considered to be more urgent. If non-lazy RCU callbacks are present, the low power state timer 40 may be set to a timeout value that is rough estimate of a typically RCU grace period, for example, six jiffies. If only lazy RCU callbacks are present, the low power state timer 40 may be set to a much larger timeout value, for example, six seconds rather than six jiffies. Once the low power state timer 40 is started, the low power state enter/callback flush function 58B returns to its caller in block 86. Typically, because the previous invocation of the low power state permission query function 58A will have resulted in the target processor 4 being placed in a low power state, the return to caller in block 86 will result in the processor remaining in a low power state. However, whereas the initial low power state was of non-fixed duration, setting the low power state timer 40 will result in the low power state being a fixed-duration low power state.

If block 82 determines that there is RCU work to be done, block 88 decrements the callback flush loop counter 36 and block 90 checks whether a callback flush loop limit has been reached. If this limit has been reached, block 92 resets the processor's callback flush holdoff counter 38 to start a holdoff period, invokes the RCU subsystem 20, and returns to its caller. Typically, because the previous invocation of the low power state permission query function 58A will have resulted in the target processor 4 being placed in a low power state, the invocation of the RCU subsystem 20 in block 92 will result in the low power decision being reevaluated. If block 90 determines that the callback flush loop limit has not been reached, block 94 rechecks for callbacks on the processor 4. If any callbacks are detected, block 94 records a quiescent state for the processor 4 and attempts to force a quiescent state on any other processors that may be delaying the end of a grace period. Block 94 then issues a request to the RCU subsystem 20 for deferred invocation of the callback handler 56A (see FIG. 6) in softirq context (or in some other safe environment). The actual commencement of the callback handler 56A thus will not occur until some time following block 94. The job of the callback handler 56A is to invoke any callbacks that are ready for immediate invocation and advance any callbacks that may not be ready for immediate invocation. The callback handler 56A also advances the RCU subsystem's grace period machinery. At the end of such processing, the callback handler 56A reinvokes the low power state permission query function 58A, and then reinvokes the low power state enter/callback flush function 58B for a possible further pass through the callback flush loop.

Figure 10:
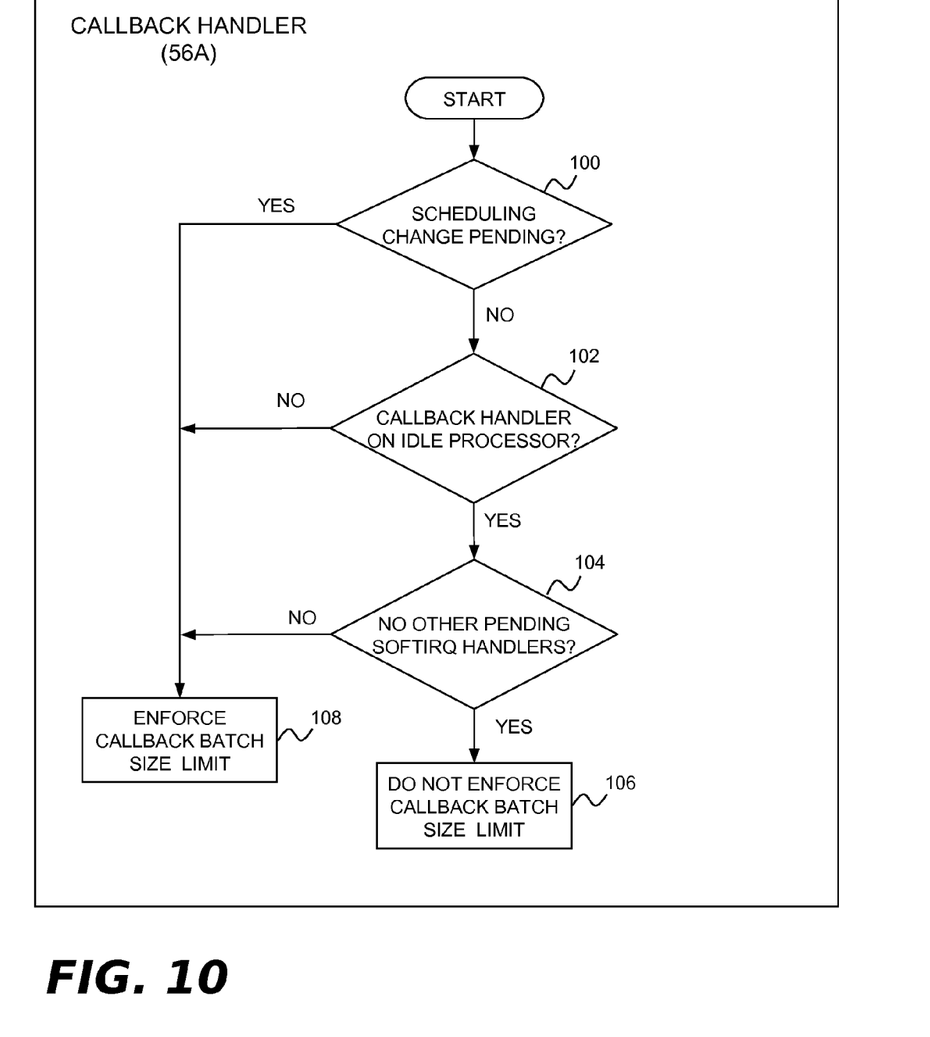
FIG. 10 is a flow diagram showing an example callback handler RCU support function.

With reference now to FIG. 10, a few example operations that may be performed by the callback handler 56A with as part of its callback processing functionality are shown. In particular, the illustrated operations focus only on that portion of the callback handler's operations that determine how many callbacks are to be processed in a single invocation. In block 100, a determination is made whether a scheduling change is pending on the target processor 4. If no scheduling change is pending, block 102 determines whether the callbacks will be processed on an idle processor 4. If so, block 104 checks to see that there no are other pending softirq handlers. If that is the case, block 106 allows callback processing to proceed with no limit on the number of callbacks. On the other hand, if block 100 determines there is a pending scheduling change, or if block 102 determines that the target processor 4 is not idle, or block 104 determines there are other pending softirq handlers, block 108 imposes a limit on the number of callbacks to be processed.

Accordingly, a technique for has been disclosed for implementing read-copy update in an improved energy efficient manner for light workloads running on systems with many processors, and in other environments. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIG. 4-10. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 11:
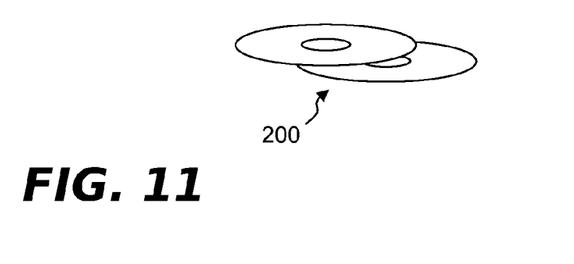
FIG. 11 is a diagrammatic illustration showing example media that may be used to provide a computer program product in accordance with the present disclosure.

Example data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of storage media that may be used to store the program instructions is shown by reference numeral 200 in FIG. 11. The storage media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions either alone or in conjunction with an operating system or other software product that incorporates the required functionality. The storage media could also be provided by other portable storage media (such as floppy disks, flash memory sticks, etc.), or storage media combined with drive systems (e.g. disk drives). As is the case with the memory 8 and the cache 10 of FIG. 4, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a multiprocessor computer system having two or more processors operatively coupled to one or more memory devices and implementing a read-copy update (RCU) subsystem, a method for determining if a processor may be placed in a low power state, comprising:
   performing a first predictive query of said RCU subsystem to request permission for one of said processors to enter said low power state;
   if said permission is denied, refraining from placing said processor in said low power state;
   if said permission is granted, placing said processor in said low power state for a non-fixed duration; and
   regardless whether said permission is denied or granted, performing a second confirming query of said RCU subsystem to redetermine whether it is permissible for said processor to be in said low power state.

2. The method of claim 1, wherein said permission is granted if said processor has no pending RCU callbacks or is not in a holdoff period following a previous invocation of said second confirming query, and wherein said permission is denied only if said holdoff period is in effect.

3. The method of claim 2, wherein said second confirming query includes:
   maintaining said processor in its current power state if said processor has no pending RCU callbacks;
   maintaining said processor in its current power state if said processor has pending RCU callbacks and said holdoff period remains in effect;
   maintaining said processor in its current power state if said processor has pending RCU callbacks but they are not ready for invocation, if said holdoff period is not in effect, and if said processor has no other RCU work to perform, and further setting a low power state time limit, such that if said processor is in said non-fixed duration low power state, said low power state becomes a fixed-duration low power state; and
   performing callback flush loop processing if said holdoff period is not in effect and if said processor has pending RCU callbacks that are ready for invocation or has other RCU work to perform.

4. The method of claim 3, wherein said low power time limit is set using a programmed timer.

5. The method of claim 4, wherein said timer is set to a first timer value if there are non-lazy RCU callbacks and a second timer value that is longer than said first timer value if only lazy RCU callbacks are present.

6. The method of claim 1, further including said RCU subsystem processing an unlimited number RCU callbacks in a single invocation if said processor has no other work to perform.

7. The method of claim 6, wherein said processor is determined to have no other work to perform if it is in an idle state with no pending scheduling change and no other immediate processing that needs to be performed by said processor.

8. A multiprocessor system, comprising:
   two or more processors;
   a memory coupled to said processors, said memory including a non-transitory computer useable medium tangibly embodying at least one program of instructions executable by said processors to implement a read-copy update (RCU) subsystem and to perform operations for determining if a processor may be placed in a low power state, said operations comprising:
   performing a first predictive query of said RCU subsystem to request permission for one of said processors to enter said low power state;
   if said permission is denied, refraining from placing said processor in said low power state;
   if said permission is granted, placing said processor in said low power state for a non-fixed duration; and
   regardless whether said permission is denied or granted, performing a second confirming query of said RCU subsystem to redetermine whether it is permissible for said processor to be in said low power state.

9. The system of claim 8, wherein said permission is granted if said processor has no pending RCU callbacks or is not in a holdoff period following a previous invocation of said second confirming query, and wherein said permission is denied only if said holdoff period is in effect.

10. The system of claim 9, wherein said processing that attempts to place said processor in said low power state includes:
    maintaining said processor in its current power state if said processor has no pending RCU callbacks;
    maintaining said processor in its current power state if said processor has pending RCU callbacks and said holdoff period remains in effect;
    maintaining said processor in its current power state power state if said processor has pending RCU callbacks but they are not ready for invocation, if said holdoff period is not in effect, and if said processor has no other RCU work to perform, and further setting a low power state time limit, such that if said processor is in said non-fixed duration low power state, said low power state becomes a fixed-duration low power state; and
    performing callback flush loop processing if said holdoff period is not in effect and if said processor has pending RCU callbacks that are ready for invocation or has other RCU work to perform.

11. The system of claim 10 wherein said low power time limit is set using a programmed timer.

12. The system of claim 11, wherein said timer is set to a first timer value if there are non-lazy RCU callbacks and a second timer value that is longer than said first timer value if only lazy RCU callbacks are present.

13. The system of claim 8, further including said RCU subsystem processing an unlimited number RCU callbacks in a single invocation if said processor has no other work to perform.

14. The system of claim 13, wherein said processor is determined to have no other work to perform if it is in an idle state with no pending scheduling change and no other immediate processing that needs to be performed by said processor.

15. A computer program product, comprising:
    one or more non-transitory machine-useable storage media;
    program instructions provided by said one or more non-transitory machine-useable storage media for programming a multiprocessor data processing platform to implement a read-copy update (RCU) subsystem and to perform operations for determining if a processor may be placed in a low power state, said operations comprising:

performing a first predictive query of said RCU subsystem to request permission for one of said processors to enter said low power state;

if said permission is denied, refraining from placing said processor in said low power state;

if said permission is granted, placing said processor in said low power state for a non-fixed duration; and regardless whether said permission is denied or granted, performing a second confirming query of said RCU subsystem to redetermine whether it is permissible for said processor to be in said low power state.

16. The computer program product of claim 15, wherein said permission is granted if said processor has no pending RCU callbacks or is not in a holdoff period following a previous invocation of said second confirming query, and wherein said permission is denied only if said holdoff period is in effect.

17. The computer program product of claim 16, wherein said processing that attempts to place said processor in said low power state includes:

maintaining said processor in its current power state if said processor has no pending RCU callbacks;

maintaining said processor in its current power state if said processor has pending RCU callbacks and said holdoff period remains in effect;

maintaining said processor in its current power state if said processor has pending RCU callbacks but they are not ready for invocation, if said holdoff period is not in effect, and if said processor has no other RCU work to perform, and further setting a low power state time limit, such that if said processor is in said non-fixed duration low power state, said low power state becomes a fixed-duration low power state; and performing callback flush loop processing if said holdoff period is not in effect and if said processor has pending RCU callbacks that are ready for invocation or has other RCU work to perform.

18. The computer program product of claim 17 wherein said low power time limit is set using a programmed timer.

19. The computer program product of claim 18, wherein said timer is set to a first timer value if there are non-lazy RCU callbacks and a second timer value that is longer than said first timer value if only lazy RCU callbacks are present.

20. The computer program product of claim 15, further including said RCU subsystem processing an unlimited number RCU callbacks in a single invocation if said processor has no other work to perform.

21. The computer program product of claim 20, wherein said processor is determined to have no other work to perform if it is in an idle state with no pending scheduling change and no other immediate processing that needs to be performed by said processor.

* * * * *